(12) United States Patent
Pinnau et al.

(10) Patent No.: US 11,319,439 B2
(45) Date of Patent: May 3, 2022

(54) POLYIMIDE BLENDS, METHODS OF MAKING EACH AND METHODS OF USE

(71) Applicant: King Abdullah University of Science and Technology, Thuwal (SA)

(72) Inventors: Ingo Pinnau, Thuwal (SA); Nasser Alaslai, Thuwal (SA); Xiaohua Ma, Thuwal (SA); Yingge Wang, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 345 days.

(21) Appl. No.: 16/482,067

(22) PCT Filed: Feb. 6, 2018

(86) PCT No.: PCT/IB2018/050737
§ 371 (c)(1),
(2) Date: Jul. 30, 2019

(87) PCT Pub. No.: WO2018/142375
PCT Pub. Date: Aug. 9, 2018

(65) Prior Publication Data
US 2020/0095423 A1 Mar. 26, 2020

Related U.S. Application Data

(60) Provisional application No. 62/454,950, filed on Feb. 6, 2017.

(51) Int. Cl.
*C08L 79/08* (2006.01)
*B01D 53/22* (2006.01)
(Continued)

(52) U.S. Cl.
CPC ............ *C08L 79/08* (2013.01); *B01D 53/228* (2013.01); *B01D 67/0013* (2013.01);
(Continued)

(58) Field of Classification Search
CPC .... B01D 67/0013; B01D 71/64; B01D 69/12; B01D 69/02; B01D 53/228;
(Continued)

(56) References Cited

U.S. PATENT DOCUMENTS 5,939,498 A    8/1999  Sutton et al.
2010/0133190 A1  6/2010  Liu et al.
(Continued)

FOREIGN PATENT DOCUMENTS

CN    103025796 A    4/2013
CN    105555838 A    5/2016
(Continued)

OTHER PUBLICATIONS

Notification of Transmittal of the International Search Report and the Written Opinion of the International Searching Authority, or the Declaration for PCT/IB2018/050737 dated Apr. 16, 2018.
(Continued)

*Primary Examiner* — Vishal V Vasisth
(74) *Attorney, Agent, or Firm* — Billion & Armitage (57) ABSTRACT

Embodiments of the present disclosure describe polyimide blend compositions, methods of making polyimide blend compositions, methods of using polyimides, membranes including polyimide blends, methods of making membranes including polyimide blends, methods of separating mixtures using the membranes including polyimide blends, and the like.

18 Claims, 4 Drawing Sheets

(51) Int. Cl.
*B01D 67/00* (2006.01)
*B01D 69/02* (2006.01)
*B01D 69/12* (2006.01)
*B01D 71/64* (2006.01)
*C08G 73/10* (2006.01)

(52) U.S. Cl.
CPC ............ *B01D 69/02* (2013.01); *B01D 69/12* (2013.01); *B01D 71/64* (2013.01); *C08G 73/1039* (2013.01); B01D 2325/022 (2013.01); C08L 2205/025 (2013.01)

(58) Field of Classification Search
CPC .......... B01D 2256/22; B01D 2257/304; B01D 2325/022; B01D 2257/7022; B01D 2257/504; B01D 2256/18; B01D 2258/0283; B01D 2256/16; B01D 2256/12; B01D 2256/245; B01D 2257/102; B01D 2325/02; C08L 79/08; C08L 2205/025; C08L 2205/02; C08G 73/1039; Y02P 20/151; Y02C 20/40
See application file for complete search history.

(56) References Cited

U.S. PATENT DOCUMENTS

| | | |
|---|---|---|
| 2015/0000519 A1 | 1/2015 | Liu et al. |
| 2016/0177035 A1 | 6/2016 | Liu |

FOREIGN PATENT DOCUMENTS

| | | |
|---|---|---|
| EP | 3576863 B1 | 10/2020 |
| JP | 2006224097 A | 8/2006 |
| JP | 2012521870 A | 9/2012 |
| JP | 2015083296 A | 4/2015 |
| JP | 2015150474 A | 8/2015 |
| WO | 2011129329 A1 | 10/2011 |
| WO | 2014209701 A1 | 12/2014 |
| WO | 2016009273 A2 | 1/2016 |

OTHER PUBLICATIONS

Chung, et al., "Ternary Fluoro-containing Polyimide Blends and Fluoro-containing Polyimide/Polyester Blends", Polymers for Advanced Technologies, Aug. 22, 1996, 537 544.

Garci'a, et al., "Aliphatic-aromatic polyimide blends for H2 separation", International Journal of Hydrogen Energy, 2010, 8983-8992.

John Wiley & Sons Inc., "Fluoro-Containing Polyimide Blends: Prediction and Experiments", Journal of Polymer Science: Part A Polymer Chemistry, 1991, 1207-1212.

Puleo, et al., "The Effect of Degree of Acetylation on Gas Sorption and Transport Behavior in Cellulose Acetate", Journal of Membrane Science, 1989, 301-332.

Xiaohua, et al., "Bifunctionalized Intrinsically Microporous Polyimides with Simultaneously Enhanced Gas Permeability and Selectivity", Macromolecular Rapid Communication, 2016, 900-904.

Xiaohua, et al., "Synthesis and Gas Transport Properties of Hydroxyl-Functionalized Polyimides with Intrinsic Microporosity", Macromolecules, 2012, 3841-3849.

Yanfeng, et al., "Gas permeability properties of Matrimid® membranes containing the metal-organic framework Cu—BPY-HFS", Journal of Membrane Science, Jan. 2, 2008, 170-181.

POLYIMIDE BLENDS, METHODS OF MAKING EACH AND METHODS OF USE

This application is a 371 of PCT/IB2018/050737 filed Feb. 6, 2018 which claims benefit of 62/454,950 filed Feb. 6, 2017.

BACKGROUND

During the last decade high-free-volume glassy polymers of intrinsic microporosity (PIMs) have been developed and extensively studied. PIMs combine high internal surface areas with the design flexibility that can potentially be exploited in a number of important industrial applications including catalysis, selective adsorption of small molecules, sensors for trace substance detection, gas storage, and membrane-based separations. The microporosity in these materials is due to their rigid and contorted macromolecular architectures that pack inefficiently in the solid state. However, there is still a quest for novel custom-designed building blocks to further modify and develop new PIMs to further enhance their desirable properties and applications.

SUMMARY

In general, embodiments of the present disclosure describe polyimide blend compositions, methods of making polyimide blend compositions, methods of using polyimides, membranes including polyimide blends, methods of making membranes including polyimide blends, methods of separating mixtures using the membranes including polyimide blends, and the like.

Accordingly, embodiments of the present disclosure describe a polyimide blend composition comprising a first 6FDA-based polyimide homopolymer, wherein the first polyimide homopolymer comprises a divalent moiety including one or more hydroxyl groups; and a second 6FDA-based polyimide homopolymer, wherein the second polyimide homopolymer comprises a divalent moiety including one or more carboxyl groups.

Embodiments of the present disclosure describe a membrane comprising a polyimide blend comprising a first 6FDA-based polyimide homopolymer, wherein the first polyimide homopolymer comprises a divalent moiety including one or more hydroxyl groups; and a second 6FDA-based polyimide homopolymer, wherein the second polyimide homopolymer comprises a divalent moiety including one or more carboxyl groups.

Embodiments of the present disclosure describe a method of making a polyimide-blend membrane comprising mixing a first 6FDA-based polyimide homopolymer and a second 6FDA-based polyimide homopolymer sufficient to form a homogenous solution, wherein the first polyimide homopolymer comprises a divalent moiety including one or more hydroxyl groups and the second polyimide homopolymer comprises a divalent moiety including one or more carboxyl groups; casting the homogenous solution; and removing solvent.

Embodiments of the present disclosure describe a method of separating a fluid mixture comprising contacting a fluid mixture with a membrane comprising a polyimide blend, wherein the fluid mixture includes two or more chemical species, wherein the polyimide blend includes a first 6FDA-based polyimide homopolymer, wherein the first polyimide homopolymer comprises a divalent moiety including one or more hydroxyl groups; and a second 6FDA-based polyimide homopolymer, wherein the second polyimide homopolymer comprises a divalent moiety including one or more carboxyl groups; and capturing at least one of the chemical species from the fluid mixture.

The details of one or more examples are set forth in the description below. Other features, objects, and advantages will be apparent from the description and from the claims.

BRIEF DESCRIPTION OF DRAWINGS

This written disclosure describes illustrative embodiments that are non-limiting and non-exhaustive. In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

Reference is made to illustrative embodiments that are depicted in the figures, in which.

DETAILED DESCRIPTION

The invention of the present disclosure relates to polyimide blends, methods of making polyimides, methods of using polyimides, membranes including the polyimide blends, methods of separating mixtures using the blend membrane, and the like. This disclosure is the first example of OH- and COOH-functionalized homopolymer building blocks for polyimide blends. In particular, this disclosure provides for polyimide blends made from a first homopolymer containing hydroxyl-functionalized diamine repeat units (e.g., 4,4'-(hexafluoroisopropylidene)diphthalic anhydride-based [6FDA]) and a second homopolymer containing carboxyl-functionalized diamine repeat units (e.g., 6FDA-based). Specifically, embodiments of the polyimide blends exhibit extraordinarily high selectivity combined with higher gas permeability compared to commercially used gas separation membrane materials.

Due to their good solubilities as well as thermal and chemical stabilities, these materials can be implemented in a wide range of industrial applications related to aerospace industry, electronic industry, high temperature adhesion, membranes for separation, composite materials, sensors for trace substance detection, and in high temperature adhesion and composite mate.

The polyimide blends can be used to make membranes, which can be used for fluid separations, for example. The interactions of the OH— and COOH moieties permit design principles for the generation of extremely selective polyimide blend membranes. In an embodiment, the membranes of the present disclosure can be used in membrane-based gas separation applications including industrial applications such as air separation (e.g., onsite nitrogen production and oxygen-enriched air ($O_2/N_2$)), hydrogen recovery ($H_2/N_2$ and $H_2/CH_4$), natural gas sweetening ($CO_2/CH_4$), acid gas removal from natural gas, nitrogen removal from natural gas, olefin/paraffin separation, and carbon capture from flue gas ($CO_2/N_2$).

Definitions

The terms recited below have been defined as described below. All other terms and phrases in this disclosure shall be construed according to their ordinary meaning as understood by one of skill in the art.

As used herein, "substituted" refers to any one or more hydrogens on the designated atom that can be replaced with a selection from the indicated group, provided that the designated atom's normal valence is not exceeded.

As used herein, "aliphatic" or "aliphatic group" refers to a saturated or unsaturated, linear or branched, cyclic (non-aromatic) or heterocyclic (non-aromatic), hydrocarbon or hydrocarbon group and encompasses alkyl, alkenyl, and alkynyl groups, and alkanes, alkene, and alkynes, for example. Reference to aliphatic includes substituted or unsubstituted.

As used herein, "cyclic" group refers to a cyclic hydrocarbon having a stable 4, 5, 6, 7, 8, 9, 10, 11, or 12 membered (e.g., carbon or hetero), (unless the number of members is otherwise recited), monocyclic, bicyclic, or tricyclic cyclic ring. Reference to cyclic includes substituted or unsubstituted.

As used herein, "alkyl" or "alkyl group" refers to a linear or branched saturated aliphatic hydrocarbon (e.g., 1 to 20 carbons, 1 to 10 carbons, or 1 to 6 carbons), that can be saturated or unsaturated. Examples of alkyl include, but are not limited to iso-propyl, sec-butyl, t-butyl, and iso-pentyl. Reference to alkyl includes substituted or unsubstituted.

The term "substituted," as in "substituted alkyl", "substituted aryl," "substituted heteroaryl" and the like means that the substituted group may contain in place of one or more hydrogens a group such as alkyl, hydroxy, amino, halo, trifluoromethyl, cyano, —NH(lower alkyl), —N(lower alkyl)$_2$, lower alkoxy, lower alkylthio, or carboxy, and thus embraces the terms haloalkyl, alkoxy, fluorobenzyl, and the sulfur and phosphorous containing substitutions referred to below.

As used herein, "halo", "halogen", or "halogen radical" refers to a fluorine, chlorine, bromine, and iodine, and radicals thereof. Further, when used in compound words, such as "haloalkyl" or "haloalkenyl", "halo" refers to an alkyl or alkenyl radical in which one or more hydrogens are substituted by halogen radicals. Examples of haloalkyl include, but are not limited to, trifluoromethyl, trichloromethyl, pentafluoroethyl, and pentachloroethyl.

As used herein, "aryl" refers to an aromatic monocyclic or multicyclic ring system of about 4 to about 14 carbon atoms, preferably of about 6 to about 10 carbon atoms. Exemplary aryl groups include phenyl or naphthyl, or phenyl substituted or naphthyl substituted. Reference to aryl includes substituted or unsubstituted.

As used herein, "heteroaryl" denotes an aromatic ring or fused ring structure of carbon atoms (e.g., 4 to 14) with one or more non-carbon atoms (e.g., 1 to 6), such as oxygen, nitrogen, and sulfur, in the ring or in one or more of the rings in fused ring structures. Preferred examples are furanyl, imidazyl, pyranyl, pyrrolyl, and pyridyl. Reference to heteroaryl includes substituted or unsubstituted.

Embodiments of the present disclosure describe a polyimide blend composition. The polyimide blend composition may generally comprise one or more polyimide homopolymers. In many embodiments, the polyimide blend composition comprises two polyimide homopolymers or at least two polyimide homopolymers. In an embodiment, at least one of the polyimide homopolymers comprises a 6FDA-based polyimide homopolymer containing a divalent moiety including one or more hydroxyl groups, and at least one of the polyimide homopolymers comprises a 6FDA-based polyimide homopolymer containing a divalent moiety including one or more carboxyl groups. In another embodiment, at least one of the polyimide homopolymers comprises a homopolymer containing hydroxyl-functionalized diamine repeat units, and at least one of the polyimide homopolymers comprise a homopolymer containing carboxyl-functionalized diamine repeat units.

In an embodiment, the polyimide blend composition comprises a first polyimide homopolymer and a second polyimide homopolymer. One or more of the first polyimide homopolymer and the second polyimide homopolymer may comprise one or more of a first 6FDA-based polyimide homopolymer and a second 6FDA-based polyimide homopolymer. One or more of the first 6FDA-based polyimide homopolymer and the second 6FDA-based polyimide homopolymer may comprise one or more of a divalent moiety including one or more hydroxyl groups and a divalent moiety including one or more carboxyl groups. In an embodiment, the first 6FDA-based polyimide homopolymer includes a divalent moiety including one or more hydroxyl groups and the second 6FDA-based polyimide homopolymer includes a divalent moiety including one or more carboxyl groups. In an embodiment, the first 6FDA-based polyimide homopolymer includes a divalent moiety including one or more carboxyl groups and the second 6FDA-based polyimide homopolymer includes a divalent moiety including one or more hydroxyl groups.

In an embodiment, the polyimide blend composition comprises a first polyimide homopolymer and a second polyimide homopolymer. One or more of the first polyimide homopolymer and the second polyimide homopolymer may comprise one or more of a homopolymer containing hydroxyl-functionalized diamine repeat units and a homopolymer containing carboxyl-functionalized diamine repeat units. In an embodiment, the first polyimide homopolymer comprises a homopolymer containing hydroxyl-functionalized diamine repeat units and the second polyimide homopolymer comprises a homopolymer comprising carboxyl-functionalized diamine repeat units. In an embodiment, the first polyimide homopolymer comprises a homopolymer containing carboxyl-functionalized diamine repeat units and the second polyimide homopolymer comprises a homopolymer comprising hydroxyl-functionalized diamine repeat units.

In embodiments where the polyimide homopolymers include 6FDA-based polyimide homopolymers, the 6FDA-based polyimide homopolymers may be characterized by one or more of formula (1):

where each of m and n is independently 1 to 10,000; and formula (2):

where each of m and n is independently 1 to 10,000. For example, in an embodiment, the polyimide blend includes at least one polyimide homopolymer characterized by formula (1) and at least one polyimide homopolymer characterized by formula (2).

In an embodiment, the polyimide may be a polyimide blend containing the following polyimide homopolymers:

and where m and n are independently 1 to 10,000.

The polyimide homopolymers may comprise a divalent moiety including one or more hydroxyl groups (Q). In an embodiment, the divalent moiety including one or more hydroxyl groups (Q) may include one or more of the following:

SBI

A = any aromatic rings

SBF

BIN

TPE

EA

TB

In an embodiment, each of $R_1$ and $R_2$ is independently one or more of a linear or branched $C_pH_{2p+1}$, where p is 1 to 6, an aryl group, a halogen, and a nitrile group, where each is independently and optionally substituted with one or more halogens for one or more H. Even when $R_1$ and $R_2$ are referred to more than once in a structure, each instance of $R_1$ or $R_2$ are independently selected.

In an embodiment, "A" can be a divalent moiety such as a $C_5$ to $C_{20}$ aromatic ring(s) such as an aryl group and a heteroaryl group, where each are substituted or unsubstituted. For example, A may comprise a substituted or unsubstituted $C_5$-$C_{20}$ aromatic ring.

When a bond (such as a dashed bond) is directed to the middle of a ring, this indicates that, optionally, 1 to 4 R groups can be attached to the ring and each R group can be independently selected. As used herein, the phrase "independently selected from" can mean selection from the moieties or functional groups independent of one another, or can mean that in each instance of the moiety or functional group each are selected independently of the other moieties or functional groups.

The polyimide homopolymers may comprise a divalent moiety including one or more carboxyl groups (Z). In an embodiment, the divalent moiety including one or more carboxyl groups (Z) may include:

where R is H or $C_1$-$C_6$ non-substituted or substituted linear or branched alkyl groups.

In an embodiment, the first polyimide homopolymer may be characterized by formula (3):

where each m and n is independently 1 to 10,000. In addition or in the alternative, the second polyimide homopolymer may be characterized by formula (4):

where each of m and n is independently 1 to 10,000. In an embodiment, each of $R_3$ and $R_4$ are independently selected from: a linear or branched $C_pH_{2p+1}$, where p is 1 to 6, an aryl group, a halogen or a nitrile group, where each is independently and optionally substituted with one or more halogens for one or more H. In other embodiments, the first polyimide homopolymer may be characterized by formula (4) and the second polyimide homopolymer may be characterized by formula (3).

Figure 1:
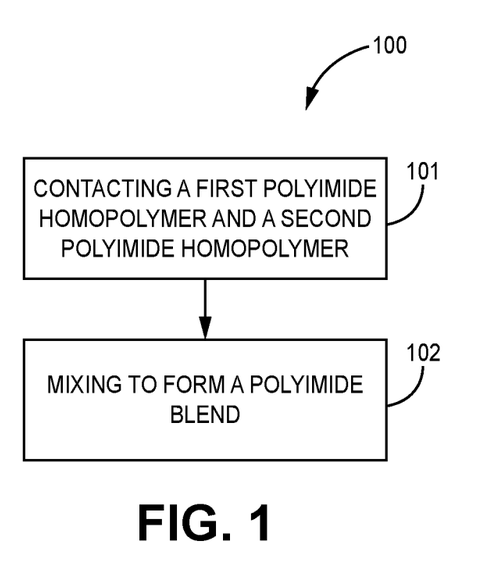
FIG. 1 is a flowchart of a method of making polyimide blends, according to one or more embodiments of the present disclosure.

Embodiments of the present disclosure also describe methods of making polyimide blends. FIG. 1 is a flowchart of a method 100 of making polyimide blends, according to one or more embodiments of the present disclosure. As shown in FIG. 1, the method 100 comprises contacting 101 a first polyimide homopolymer and a second polyimide homopolymer and mixing 102 the first polyimide homopolymer and the second polyimide homopolymer to form a polyimide blend. Any of the polyimide homopolymers of the present disclosure and any variations thereof may be used in these embodiments.

Contacting refers to the act of touching, making contact, or of bringing to immediate or close proximity, including at the cellular or molecular level, for example, to bring about a physiological reaction, a chemical reaction, or a physical change, e.g., in a solution, in a reaction mixture, in vitro, or in vivo. Any method of contacting known in the art may be used at for this step. For example, contacting may include adding the first polyimide homopolymer and the second polyimide homopolymer to an instrument commonly used for bringing two or more components together (e.g., a flask or beaker).

Mixing generally refers to the facilitation of contact between two or more components. Any method of mixing known in the art may be used for this step. For example, mixing may include shaking, stirring, swirling, shaking, agitating, sonicating, etc. For example, mixing may include swirling or stirring (e.g., magnetic stir bar) sufficient to form a polyimide blend. In an embodiment, mixing includes stirring sufficient to form a homogenous solution. In an embodiment, mixing includes stirring sufficient to from a clear solution. In an embodiment, mixing includes stirring sufficient to form a clear homogenous solution.

Embodiments of the present disclosure further describe membranes comprising polyimide blends. The membranes comprising polyimide blends may comprise a first polyimide homopolymer and a second polyimide homopolymer. In an embodiment, the first polyimide homopolymer may comprise a first 6FDA-based polyimide homopolymer. In an embodiment, the first 6FDA-based polyimide homopolymer may comprise a divalent moiety including one or more hydroxyl groups. In an embodiment, the first 6FDA-based polyimide homopolymer may comprise a divalent moiety including one or more carboxyl groups. In an embodiment, the second polyimide homopolymer may comprise a second 6FDA-based polyimide homopolymer. In an embodiment, the second 6FDA-based polyimide homopolymer may comprise a divalent moiety including one or more carboxyl groups. In an embodiment, the second 6FDA-based polyimide homopolymer may comprise a divalent moiety including one or more hydroxyl groups. Any of the polyimide homopolymers and/or components thereof described herein and any variations thereof, including, but not limited to, the first polyimide homopolymers and/or second polyimide homopolymers described herein, may be included in these embodiments.

Embodiments of the membranes can be used for fluid separations, including gas separation, nanofiltration, pervaporation and the like, as well as sensor applications. Embodiments of the membrane can include pores having a pore size of about 20 Å or less, about 15 Å or less, about 10 Å or less, or about 7 Å or less (e.g., the lower limit for each is about 2 Å). In an embodiment, the pores can extend through the membrane and a straight or winding pattern, have one or more branches or the like and the pore diameter can vary along the length of the pores as well. The membrane can be used to separate mixtures such as gas mixtures. Exemplary embodiments of mixtures includes the following: $O_2/N_2$; $H_2/N_2$; $H_2/C_{1+}$ hydrocarbon; $He/C_{1+}$ hydrocarbon; $CO_2/C_{1+}$ hydrocarbons; $CO_2/N_2$; $CH_4/H_2S$; and olefin/paraffin. In an embodiment, the membrane can have a thickness one the scale of microns to centimeters or more, depending upon the particular application. The polyimide blends of the present disclosure can be fabricated into any type of membrane structure. For example, polyimide blends can be produced as integrally-skinned asymmetric membrane by a phase inversion process or as thin-film composite membrane by a solution-coating process onto a porous support material of any type. The polyimide blend membrane can be produced as flat-sheet membrane or in hollow-fiber geometry.

Accordingly, embodiments of the present disclosure also describe methods of making a polyimide-blend membrane. For example, in an embodiment, the polyimide blends can be used to make membranes, which can be used for fluid separations, for example. The interactions of the OH— and COOH moieties permit design principles for the generation of extremely selective polyimide blend membranes. In an embodiment, the membranes of the present disclosure can be used in membrane-based gas separation applications including industrial applications such as air separation (e.g., onsite nitrogen production and oxygen-enriched air ($O_2$/$N_2$)), hydrogen recovery ($H_2/N_2$ and $H_2/CH_4$), natural gas sweetening ($CO_2/CH_4$), acid gas removal from natural gas, nitrogen removal from natural gas, olefin/paraffin separation, and carbon capture from flue gas ($CO_2/N_2$).

Figure 2:
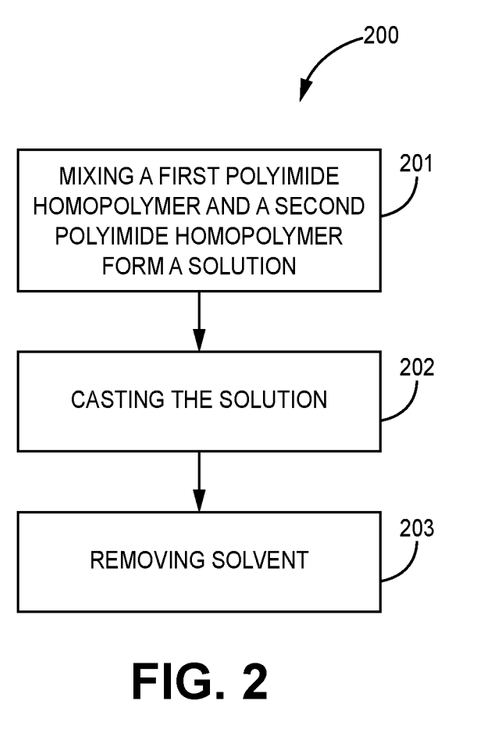
FIG. 2 is a flowchart of a method of making a polyimide-blend membrane, according to one or more embodiments of the present disclosure.

FIG. 2 is a flowchart of a method of making a polyimide-blend membrane, according to one or more embodiments of the present disclosure. As shown in FIG. 2, the method comprises mixing 201 a first polyimide homopolymer and a second polyimide homopolymer to form a solution. At step 202, the method may comprise casting 202 the solution. At step 203, the method may comprise removing solvent.

In an embodiment, the method 200 may comprise mixing 201 a first 6FDA-based polyimide homopolymer and a second 6FDA-based polyimide homopolymer sufficient to form a solution (e.g., a homogenous solution). The first polyimide homopolymer may comprise a divalent moiety including one or more hydroxyl groups. The second polyimide homopolymer may comprise a divalent moiety including one or more carboxyl groups. In an embodiment, mixing 201 may include contacting about 20 wt % to about 50 wt % of the first 6FDA-based polyimide homopolymer with about 50 wt % to about 80 wt % of the second 6FDA-based polyimide homopolymer. In an embodiment, mixing 201 may include contacting less than about 20 wt % of the first 6FDA-based polyimide homopolymer. In an embodiment, mixing 201 may include contacting more than about 50 wt % of the first 6FDA-based polyimide homopolymer. In an embodiment, mixing 201 may include contacting less than about 50 wt % of the second 6FDA-based polyimide homopolymer. In an embodiment, mixing 201 may include contacting more than about 80 wt % of the second 6-FDA-based polyimide homopolymer.

At step 202, the method 200 may further comprise casting 202 the homogenous solution. Casting generally refers to disposing a material on, in, or around an object or mold, among other things. For example, casting may include, but is not limited to, one or more of depositing, pouring, dipping, coating, and applying. In many embodiments, casting may refer to disposing a solution on a substrate. The substrate may include any suitable substrate. In many embodiments, the substrate is glass. For example, in an embodiment, casting includes casting the solution on glass plates.

At step 203, the method 200 may further comprise removing 203 solvent. Removing generally refers to one or more of drying, heating, evaporating, washing, and any other method known in the art for removing solvent. In many embodiments, removing generally includes drying or evaporating sufficient to substantially or completely remove solvent. In an embodiment, removing includes covering the casted solution with a Petri dish to control evaporation. In an embodiment, removing includes drying at about room temperature for at least about 10 hours, at least about 20 hours, at least about 30 hours, or, more preferably, for at least about 40 hours. In an embodiment, removing includes drying under vacuum at about 200° C. for about 5 hours, at least about 10 hours, at least about 15 hours, at least about 20 hours, or, more preferably, at least about 24 hours.

Embodiments of the present disclosure provide for methods of separating a fluid mixture. A mixture can be introduced to a polyimide blend membrane that includes the polyimides described herein. The mixture includes a first component and a second component and the first component and the second component are different. The mixture can be a gas or liquid. The mixture can include those described herein. A first component can be separated from the second component when a first component passes through the polyimide membrane and the second component does not substantially (e.g., less than about 20%, less than about 10%, less than about 5%, less than about 2%, less than about 1%, less than about 0.5%) pass through the membrane or does not pass through the polyimide membrane.

Figure 3:
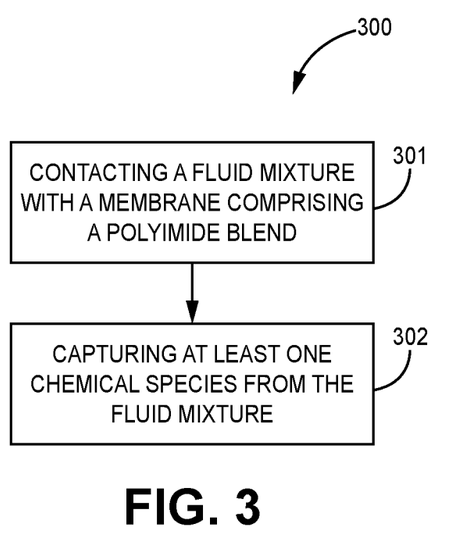
FIG. 3 is a flowchart of a method of separating a fluid mixture, according to one or more embodiments of the present disclosure.

FIG. 3 is a flowchart of a method of separating a fluid mixture, according to one or more embodiments of the present disclosure. As shown in FIG. 3, the method comprises contacting 301 a fluid mixture with a membrane comprising a polyimide blend. At step 302, the method may comprise capturing 302 at least one chemical species from the fluid mixture.

In an embodiment, the method may comprise contacting 301 a fluid mixture with a membrane comprising a polyimide blend, wherein the polyimide blend includes a first 6FDA-based polyimide homopolymer, wherein the first polyimide homopolymer comprises a divalent moiety including one or more hydroxyl groups; and a second 6FDA-based polyimide homopolymer, wherein the second polyimide homopolymer comprises a divalent moiety including one or more carboxyl groups. At step 302, the method may comprise capturing 302 at least one chemical species from the fluid mixture.

The following Examples are intended to illustrate the above invention and should not be construed as to narrow its scope. One skilled in the art will readily recognize that the Examiners suggest many other ways in which the invention could be practiced. It should be understand that numerous variations and modifications may be made while remaining within the scope of the invention.

EXAMPLE 1

Polyimide Blend Membrane Based on PIM-6FDA-OH/6FDA-DABA

Polyimide blend membrane 1 of the present disclosure can be made by mixing 20 wt % PIM-6FDA-OH with 80 wt % 6FDA-DABA in tetrahydrofuran at 25° C. The clear homogeneous solution was cast on leveled glass plates and covered with a Petri dish to control the evaporation rate. After drying at room temperature for 40 hours the membrane was removed from the glass plate and dried to completion under vacuum at 200° C. for 24 hours. Thermogravimetric analysis confirmed that the polymer film was completely solvent free. The thickness of the film was 40 μm as determined with a precision micrometer.

EXAMPLE 2

Polyimide Blend Membrane Based on Trip-OH/6FDA-DABA

Polyimide blend membrane 2 of the present disclosure can be made by mixing 20 wt % Trip-OH with 80 wt %

6FDA-DABA in tetrahydrofuran at 25° C. The clear homogeneous solution was cast on leveled glass plates and covered with a Petri dish to control the evaporation rate. After drying at room temperature for 40 hours the membrane was removed from the glass plate and dried to completion under vacuum at 200° C. for 24 hours. Thermogravimetric analysis confirmed that the polymer film was completely solvent free. The thickness of the film was 40 μm as determined with a precision micrometer.

EXAMPLE 3

Polyimide Blend Membrane Based on PIM-6FDA-OH/6FDA-DABA

Polyimide blend membrane 3 of the present disclosure can be made by mixing 50 wt % PIM-6FDA-OH with 50 wt % 6FDA-DABA in tetrahydrofuran at 25° C. The clear homogeneous solution was cast on leveled glass plates and covered with a Petri dish to control the evaporation rate. After drying at room temperature for 40 hours the membrane was removed from the glass plate and dried to completion under vacuum at 200° C. for 24 hours. Thermogravimetric analysis confirmed that the polymer film was completely solvent free. The thickness of the film was 50 μm as determined with a precision micrometer.

EXAMPLE 4

Gas Permeation Properties of Polyimide Blend Membranes

The gas permeation properties of polyimide blend membranes (Examples 1-3) were evaluated with a constant volume/variable pressure test method. The experiments were performed at 35° C. with a feed pressure of 2 bar and a permeate pressure of less than 1 torr. The results are summarized in Table 1. The results demonstrate that the polyimide blend membranes exhibit extraordinarily high selectivities for a variety of important industrial gas separation applications, such as $H_2/N_2$, $O_2/N_2$, $CO_2/N_2$ and $CO_2/CH_4$. The gas permeation properties of two conventional commercial gas separation membrane materials, cellulose triacetate and Matrimid, are shown in Table 1 for comparison. It is clear that the polymer blends of the present disclosure show significantly high permeabilities for the more permeable feed gas components ($H_2$, $CO_2$ and $O_2$) than the currently available commercial membrane types combined with highly enhanced selectivities for all gas pairs.

TABLE 1

A. Permeability of Polyimide Blend Membranes

| Polymer | Permeability (Barrer) | | | | |
|---|---|---|---|---|---|
| | $H_2$ | $N_2$ | $O_2$ | $CH_4$ | $CO_2$ |
| Blend 1 | 42 | 0.21 | 2.4 | 0.066 | 9 |
| Blend 2 | 48 | 0.24 | 2.89 | 0.096 | 12.2 |
| Blend 3 | 68 | 0.6 | 4.83 | 0.17 | 16.3 |
| Cellulose triacetate[1] | 15.5 | 0.23 | 1.46 | 0.2 | 6.6 |
| Matrimid[2] | 17.5 | 0.22 | 1.46 | 0.21 | 7.3 |

TABLE 1-continued

B. Ideal Selectivity of Polyimide Blend Membranes

| Polymer | Ideal Selectivity ($\alpha_{x/y}$) | | | |
|---|---|---|---|---|
| | $H_2/N_2$ | $O_2/N_2$ | $CO_2/N_2$ | $CO_2/CH_4$ |
| Blend 1 | 200 | 11.4 | 42.8 | 136 |
| Blend 2 | 200 | 12.0 | 50.8 | 127 |
| Blend 3 | 113 | 8.1 | 27.2 | 96 |
| Cellulose triacetate[1] | 67 | 6.3 | 29 | 33 |
| Matrimid[2] | 80 | 6.6 | 33 | 35 |

Blend 1 is 80 6FDA-DABA + 20 PIM-6FDA-OH, Blend 2 is 80 6FDA-DABA + 20 Trip-OH, Blend 3 is 50 PIM-6FDA-OH + 50 6FDA-DABA.
Ref. [1]A. C. Puleo et al., J. Membr. Sci. 47 (1989) 301-332.
Ref. [2]Y. Zhang et al., J. Membr. Sci. 313 (2008) 170-181.

EXAMPLE 5

Membrane Based on PIM-6FDA-OH

Comparative Example 1

A PIM-6FDA-OH membrane 1 can be made by mixing 7 wt % homo-polymer in tetrahydrofuran at 25° C. The clear homogeneous solution was cast on leveled glass plates and covered with a Petri dish to control the evaporation rate. After drying at room temperature for 40 hours the membrane was removed from the glass plate and dried to completion under vacuum at 200° C. for 24 hours. Thermogravimetric analysis confirmed that the polymer film was completely solvent free. The thickness of the film was 45 μm as determined with a precision micrometer.

EXAMPLE 6

Membrane Based on Trip-OH

Comparative Example 2

A Trip-OH membrane can be made by mixing 7 wt % homo-polymer in tetrahydrofuran at 25° C. The clear homogeneous solution was cast on leveled glass plates and covered with a Petri dish to control the evaporation rate. After drying at room temperature for 40 hours the membrane was removed from the glass plate and dried to completion under vacuum at 200° C. for 24 hours. Thermogravimetric analysis confirmed that the polymer film was completely solvent free. The thickness of the film was 40 μm as determined with a precision micrometer.

EXAMPLE 7

Membrane Based on 6FDA-DABA

Comparative Example 3

A 6FDA-DABA membrane can be made by mixing 7 wt % homo-polymer in tetrahydrofuran at 25° C. The clear homogeneous solution was cast on leveled glass plates and covered with a Petri dish to control the evaporation rate. After drying at room temperature for 40 hours the membrane was removed from the glass plate and dried to completion under vacuum at 200° C. for 24 hours. Thermogravimetric analysis confirmed that the polymer film was completely solvent free. The thickness of the film was 42 μm as determined with a precision micrometer.

EXAMPLE 8

Gas Permeation Properties of Polyimide Homopolymers

Comparative Example 4

The gas permeation properties of polyimide homo-polymers (comparative examples 1-3) were evaluated with a constant volume/variable pressure test method. The experiments were performed at 35° C. with a feed pressure of 2 bar and a permeate pressure of less than 1 torr. The results are summarized in Table 2. The results demonstrate clearly that the polyimide homo-polymer membranes have significantly lower selectivities for $H_2/N_2$, $O_2/N_2$, $CO_2/N_2$ and $CO_2/CH_4$ separation as compared to the novel polyimide blend membranes listed in Table 1. Although not bound by any theory, it is believed that the polyimide blend membranes of the present disclosure exhibits extraordinarily high selectivities due to strong interactions between the functional —OH and —COOH groups of the blended homo-polymers.

TABLE 2

A. Permeability of Polyimide Homopolymer Membranes

| Polymer | Permeability (Barrer) | | | | |
|---|---|---|---|---|---|
| | $H_2$ | $N_2$ | $O_2$ | $CH_4$ | $CO_2$ |
| PIM-6FDA-OH | 181 | 5.5 | 23.8 | 3.4 | 119 |
| Trip-OH | 127 | 2.7 | 14 | 1.4 | 70 |
| 6FDA-DABA | 49 | 0.42 | 2.86 | 0.15 | 11.1 |

B. Ideal Selectivity of Polyimide Homopolymer Membranes

| Polymer | Ideal Selectivity ($\alpha_{x/y}$) | | | |
|---|---|---|---|---|
| | $H_2/N_2$ | $O_2/N_2$ | $CO_2/N_2$ | $CO_2/CH_4$ |
| PIM-6FDA-OH | 33 | 4.3 | 22 | 35 |
| Trip-OH | 47 | 5.2 | 26 | 50 |
| 6FDA-DABA | 117 | 6.8 | 26 | 74 |

Figure 4A:
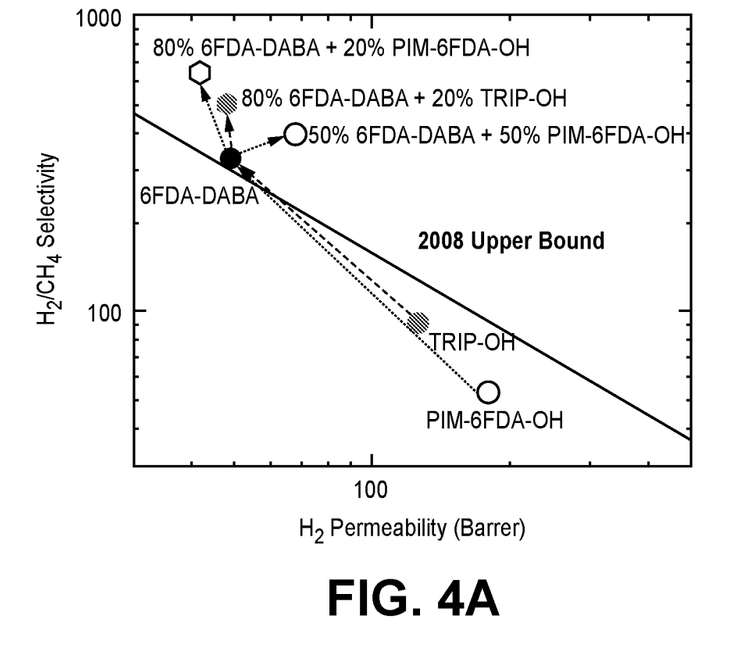
FIGS. 4A-4B are graphical views illustrating the gas separation performance of the polyimide blends and polyimide homopolymers for (A) $H_2/CH_4$ and (B) $O_2/N_2$ relative to the 2008 state-of-the-art Robeson trade-off curves, according to one or more embodiments of the present disclosure.
Figure 4B:
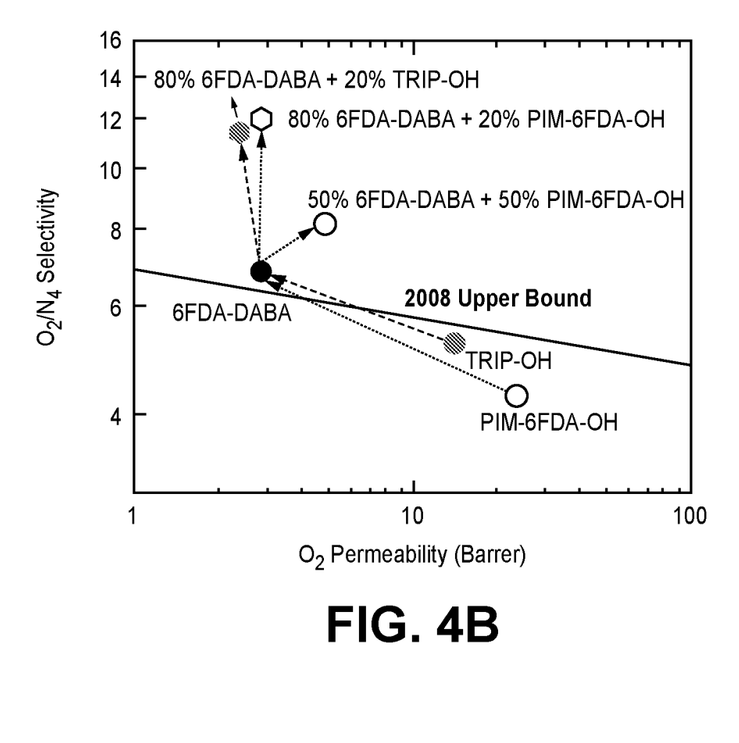

The improvement in gas separation performance of the polyimide blend membranes compared to the homo-polymers is also exemplified in FIGS. 4A-4B, which shows the 2008 Robeson permeability/selectivity upper bound performance curves for $H_2/CH_4$ and $O_2/N_2$. The blend membranes exhibit significantly increased selectivities and are located above the 2008 Robeson plots, which demonstrates the superior performance compared to state-of-the-art homo-polymers.

Other embodiments of the present disclosure are possible. Although the description above contains much specificity, these should not be construed as limiting the scope of the disclosure, but as merely providing illustrations of some of the presently preferred embodiments of this disclosure. It is also contemplated that various combinations or sub-combinations of the specific features and aspects of the embodiments may be made and still fall within the scope of this disclosure. It should be understood that various features and aspects of the disclosed embodiments can be combined with or substituted for one another in order to form various embodiments. Thus, it is intended that the scope of at least some of the present disclosure should not be limited by the particular disclosed embodiments described above.

Thus the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto

Various examples have been described. These and other examples are within the scope of the following claims.

What is claimed is:

1. A polyimide blend composition, comprising:
   a first 6FDA-based polyimide homopolymer, wherein the first polyimide homopolymer comprises a divalent moiety including one or more hydroxyl groups (Q), and wherein the first 6FDA-based polyimide homopolymer is characters by the formula:

where m is independently 1 to 10,000; and
   a second 6FDA-based polyimide homopolymer, wherein the second polyimide homopolymer comprises a divalent moiety including one or more carboxyl groups (Z), and wherein the second 6FDA-based polyimide homopolymer is characterized by the formula:

wherein n is independently 1 to 10,000.

2. The polyimide blend composition of claim 1, wherein the divalent moiety including one or more hydroxyl groups (Q) is characterized by one or more of the following formulas:

SBI

A = any aromatic rings

SBF

BIN

TPE

EA

TB wherein $R_1$ and $R_2$ are independently one or more of a linear or branched $C_pH_{2p+1}$, an aryl group, a halogen, and a nitrile group, and wherein p is 1 to 6, and wherein one or more hydrogens on each is independently and optionally substituted with one or more halogens.

3. The polyimide blend composition of claim 2, wherein each of $R_1$ and $R_2$ is independently one or more of a linear or branched $C_pH_{2p+1}$, wherein p is 1 to 6, an aryl group, a halogen, and a nitrile group.

4. The polyimide blend composition of claim 3, wherein one or more H is substituted for one or more halogens.

5. The polyimide blend composition of claim 2, wherein A is a substituted or unsubstituted $C_5$-$C_{20}$ aromatic ring.

6. The polyimide blend composition of claim 1, wherein the divalent moiety including one or more carboxyl groups (Z) is characterized by the following formula:

where R is H or $C_1$-$C_6$ alkyl groups, wherein each $C_1$-$C_6$ alkyl group is substituted or non-substituted and linear or branched.

7. The polyimide blend composition of claim 1, wherein the first 6FDA-based polyimide homopolymer is characterized by the formula:

wherein the second 6FDA-based polyimide homopolymer is characterized by the formula:

wherein each of $R_3$ and $R_4$ is independently one or more of a linear or branched $C_pH_{2p+1}$, wherein p is 1 to 6, an aryl group, a halogen, and a nitrile group.

8. A membrane comprising the polyimide blend composition of claim 1.

9. The membrane of claim 8, wherein an asymmetric membrane comprising the polyimide blend is fabricated by a phase-inversion process.

10. The membrane of claim 8, wherein a thin film composite membrane comprising the polyimide blend is fabricated by a solution-coating process on a porous support.

11. A method of making a polyimide-blend membrane, comprising:

mixing a first 6FDA-based polyimide homopolymer and a second 6FDA-based polyimide homopolymer sufficient to form a homogenous solution, wherein the first polyimide homopolymer comprises a divalent moiety including one or more hydroxyl groups (Q), and wherein the first 6FDA-based polyimide homopolymer is characters by the formula:

where m is independently 1 to 10,000, and wherein the second polyimide homopolymer comprises a divalent moiety including one or more carboxyl groups (Z), and wherein the second 6FDA-based polyimide homopolymer is characterized by the formula:

wherein n is independently 1 to 10,000;
casting the homogenous solution; and
removing solvent.

12. The method of claim 11, wherein mixing includes contacting about 20 wt % to about 50 wt % of the first 6FDA-based polyimide homopolymer with about 50 wt % to about 80 wt % of the second 6FDA-based polyimide homopolymer.

13. The method of claim 11, wherein casting the homogenous solution includes casting the homogenous solution on glass plates.

14. The method of claim 11, wherein removing solvent includes one or more of drying at a temperature ranging from about 25° C. to about 200° C.

15. The method of claim 11, wherein the solvent is removed under vacuum.

16. A method of separating a fluid mixture, comprising:
contacting a fluid mixture with a membrane comprising a polyimide blend, wherein the fluid mixture includes two or more chemical species, wherein the polyimide blend includes a first 6FDA-based polyimide homopolymer and a second 6FDA-based polyimide homopolymer, wherein the first 6FDA-based polyimide homopolymer comprises a divalent moiety including one or more hydroxyl groups (Q) and wherein the first 6FDA-based polyimide homopolymer is characters by the formula:

where m is independently 1 to 10,000; and wherein the second 6FDA-based polyimide homopolymer comprises a divalent moiety including one or more carboxyl groups (Z) and wherein the second 6FDA-based polyimide homopolymer is characterized by the formula:

wherein n is independently 1 to 10,000; and
capturing at least one of the chemical species from the fluid mixture.

17. The method of claim 16, wherein the at least one captured chemical species passes through the polyimide blend membrane and the one or more non-captured chemical species do not substantially pass through the polyimide membrane.

18. The method of claim 16, wherein the mixture includes one of the following: $O_2/N_2$; $N_2/CH_4$; $H_2/N_2$; $H_2/C_{1+}$ hydrocarbon; $He/C_{1+}$ hydrocarbons; $CO_2/C_{1+}$ hydrocarbons; $CO_2/N_2$; $H_2S/CH_4$; $H_2O/CH_4$ and olefin/paraffin.

* * * * *